(12) United States Patent
Du et al.

(10) Patent No.: US 10,104,428 B2
(45) Date of Patent: Oct. 16, 2018

(54) VIDEO PLAYING DETECTION METHOD AND APPARATUS

(71) Applicant: BEIJING GRIDSUM TECHNOLOGY CO., LTD., Beijing (CN)

(72) Inventors: Ning Du, Beijing (CN); Fei Lin, Beijing (CN); Jie Chen, Beijing (CN)

(73) Assignee: Beijing Gridsum Technology Co., Ltd., Beijing (CN)

( * ) Notice: Subject to any disclaimer, the term of this patent is extended or adjusted under 35 U.S.C. 154(b) by 0 days.

(21) Appl. No.: 15/519,776

(22) PCT Filed: Oct. 15, 2015

(86) PCT No.: PCT/CN2015/092032
§ 371 (c)(1),
(2) Date: Apr. 17, 2017

(87) PCT Pub. No.: WO2016/062220
PCT Pub. Date: Apr. 28, 2016

(65) Prior Publication Data
US 2017/0245010 A1    Aug. 24, 2017

(30) Foreign Application Priority Data

Oct. 20, 2014 (CN) .......................... 2014 1 0559610

(51) Int. Cl.
*H04N 21/24* (2011.01)
*H04N 21/442* (2011.01)
(Continued)

(52) U.S. Cl.
CPC ... *H04N 21/44204* (2013.01); *H04N 21/2407* (2013.01); *H04N 21/44222* (2013.01); *H04N 21/466* (2013.01); *H04N 21/6587* (2013.01)

(58) Field of Classification Search
CPC ......... H04N 21/2407; H04N 21/44204; H04N 21/44222
See application file for complete search history.

(56) References Cited

U.S. PATENT DOCUMENTS 6,184,918 B1    2/2001  Goldschmidt et al.
7,603,682 B1 * 10/2009  Akiyama ............... H04H 20/82
                                                725/139
(Continued)

FOREIGN PATENT DOCUMENTS

CN      101079975 A    11/2007
CN      101345853 A    1/2009
(Continued)

OTHER PUBLICATIONS

International Search Report for counterpart PCT Application No. PCT/CN2015/092032, dated Jan. 20, 2016 (5 pgs.).

*Primary Examiner* — Robert J Hance
(74) *Attorney, Agent, or Firm* — Shumaker & Sieffert, P.A.

(57) ABSTRACT

Disclosed in the disclosure are a video playing detection method and apparatus. The video playing detection method includes: obtaining a playing count of a video at a detection pending moment; obtaining a quitting moment of the video, wherein the quitting moment is a video playing completion moment; judging whether the playing count of the video at the detection pending moment is zero; if the playing count of the video at the detection pending moment is zero, judging whether the detection pending moment is before the quitting moment; and if the detection pending moment is before the quitting moment, determining that video playing is not completed at the detection pending moment. The disclosure solves the problem in the related art where a video playing behavior cannot be accurately analyzed.

12 Claims, 5 Drawing Sheets

(51) Int. Cl.
*H04N 21/466* (2011.01)
*H04N 21/6587* (2011.01)

(56) References Cited

U.S. PATENT DOCUMENTS

| | | | |
|---|---|---|---|
| 2003/0145319 A1* | 7/2003 | Sato | H04H 60/31 |
| | | | 725/14 |
| 2003/0212993 A1 | 11/2003 | Obrador | |
| 2006/0010470 A1* | 1/2006 | Kurosaki | H04H 20/76 |
| | | | 725/46 |
| 2010/0122308 A1* | 5/2010 | Hattori | G11B 27/00 |
| | | | 725/107 |
| 2013/0216203 A1* | 8/2013 | Nakazawa | H04N 9/79 |
| | | | 386/241 |
| 2013/0268651 A1* | 10/2013 | Greenzeiger | H04N 21/252 |
| | | | 709/224 |

FOREIGN PATENT DOCUMENTS

| | | |
|---|---|---|
| CN | 101783915 A | 7/2010 |
| CN | 102833622 A | 12/2012 |
| CN | 102929938 A | 2/2013 |
| CN | 103442270 A | 12/2013 |
| CN | 103501434 A | 1/2014 |
| CN | 103686238 A | 3/2014 |
| CN | 103747331 A | 4/2014 |
| CN | 104270674 A | 1/2015 |

\* cited by examiner

VIDEO PLAYING DETECTION METHOD AND APPARATUS

This application is a U.S. national phase application under 37 U.S.C. § 371 of International Application No. PCT/CN2015/092032 filed on Oct. 15, 2015, which claims priority to CN Application No. 201410559610.5 filed Oct. 20, 2014. The entire contents of each of PCT/CN2015/092032 and CN Application No. 201410559610.5 are incorporated herein by reference.

FIELD

The disclosure relates to the field of Internet, and in particular to a video playing detection method and apparatus.

BACKGROUND

With the wide popularization of Internet video-on-demand service and the rapid development of a video related technology, the related technology has been able to extract video watching behavior characteristics of a user from video playing data. The related technology collects, by embedding data collection codes into a video playing apparatus (video playing software), a count of a video played by any user within a unit time. Further, video playing counts of all users at each moment are summated, and the sum of playing counts at each moment is laid on a time axis of video playing, so a count of watching the video by a user at each moment may be presented. The watching behavior and favor degree of the user for video contents at a specific moment may be reflected by analyzing the count of watching the video by the user at each moment. However, since video playing counts of all users are only simply summated at each moment in the related art, video watching behaviors of the users cannot be specifically analyzed. For example, the count of cyclically playing a video by a user at a certain moment is extremely high, so the total count of playing the video by the user at this moment becomes large, thereby influencing the accuracy of analysis on the watching behavior and favor degree of the user for video contents at a specific moment. For another example, when a count of playing a video by a user at a certain moment is 0, the behavior of the user at this moment cannot be judged in the related art, that is, it cannot be judged whether the user completes video watching or the user skips over video contents at this moment.

Any effective solution has not been proposed yet at present for the problem in the related art where a video playing behavior cannot be accurately analyzed.

SUMMARY OF THE INVENTION

The disclosure is mainly intended to provide a video playing detection method and apparatus, so as to solve the problem in the related art where a video playing behavior cannot be accurately analyzed.

To this end, according to an aspect of the disclosure, a video playing detection method is provided. The video playing detection method includes that: a playing count of a video at a detection pending moment is obtained; a quitting moment of the video is obtained, wherein the quitting moment is a video playing completion moment; it is judged whether the playing count of the video at the detection pending moment is zero; if the playing count of the video at the detection pending moment is zero, it is judged whether the detection pending moment is before the quitting moment; and if the detection pending moment is before the quitting moment, it is determined that video playing is not completed at the detection pending moment.

Further, the step that a playing count of a video at a detection pending moment is obtained includes that: a video playing record stored in a preset database is searched, wherein a playing record within a preset time is stored in the preset database, and the playing record includes a video playing count at each moment; a detection pending moment is determined; and a playing count corresponding to the detection pending moment is searched in the playing record.

Further, the step that the quitting moment of the video is obtained includes that: the video playing record stored in the preset database within the preset time is traversed, and it is judged whether the video playing count at each moment is 0; a first moment is obtained, wherein the first moment is a moment where a playing count is 0; it is judged whether a moment where a playing count is not 0 exists after the first moment; if the moment where the playing count is not 0 does not exist after the first moment, the first moment is the quitting moment; and if the moment where the playing count is not 0 exists after the first moment, the first moment is not the quitting moment.

Further, a plurality of playing records corresponding to a plurality of users within a preset time is stored in the preset database, and after it is determined that other moments where the playing count is not 0 do not exist after the moment where the playing count is 0, the video playing detection method further includes that: playing completion behaviors of the video are counted, wherein the playing completion behaviors are video playing behaviors at the quitting moment, a plurality of playing records is traversed to detect the quitting moment, and every time a quitting moment is detected, 1 is added to a video playing completion behavior count at the quitting moment; a first ratio is obtained, wherein the first ratio is a ratio of the playing completion behavior count to the sum of a plurality of playing records; and a playing behavior of the video at the detection pending moment is detected according to the first ratio.

Further, a plurality of playing records corresponding to a plurality of users within a preset time is stored in the preset database, and after it is determined that video playing is not completed at the detection pending moment if the detection pending moment is before the quitting moment, the video playing detection method further includes that: it is judged whether a playing count of the video at a previous moment of the detection pending moment is 0; if the playing count of the video at the previous moment of the detection pending moment is not 0, jumping behaviors of the video are counted, wherein the jumping behaviors are video playing behaviors at the detection pending moment, a plurality of playing records is traversed, and every time a previous moment of the detection pending moment is detected, 1 is added to a video jumping behavior count at the detection pending moment; a second ratio is obtained, wherein the second ratio is a ratio of the jumping behavior count to the sum of a plurality of playing records; and a playing behavior of the video at the detection pending moment is detected according to the second ratio.

Further, a plurality of playing records corresponding to a plurality of users within a preset time is stored in the preset database, and after the playing count of the video at the detection pending moment is obtained, the video playing detection method further includes that: it is judged whether the playing count of the video at the detection pending moment is greater than 1; if the playing count of the video at the detection pending moment is greater than 1, playback behaviors of the video are counted, wherein the playback behaviors are video playing behaviors at the detection pending moment, a plurality of playing records is traversed, and every time a detection pending moment is detected, 1 is added to a video playback behavior count at the detection pending moment; a third ratio is obtained, wherein the third ratio is a ratio of the playback behavior count to the sum of a plurality of playing records; and a playing behavior of the video at the detection pending moment is detected according to the third ratio.

Further, a plurality of playing records corresponding to a plurality of users within a preset time is stored in the preset database, and after the playing count of the video at the detection pending moment is obtained, the video playing detection method further includes that: it is judged whether the playing count of the video at the detection pending moment is greater than 1; if the playing count of the video at the detection pending moment is greater than 1, playback behaviors of the video are counted, wherein the playback behaviors are video playing behaviors at the detection pending moment, a plurality of playing records is traversed, and if it is detected that a count at the detection pending moment is greater than 1 in a certain playing record, 1 is added to a video playback behavior count at the detection pending moment corresponding to the playing record; a fourth ratio is obtained, wherein the fourth ratio is a ratio of the playback behavior count to the sum of a plurality of playing records; and a playing behavior of the video at the detection pending moment is detected according to the fourth ratio.

Further, the video playing detection method further includes that: a first chart is obtained according to the first ratio and the playing moment of the video, wherein a horizontal axis of the first chart is the playing moment of the video, and a longitudinal axis of the first chart is the first ratio; and the first chart is output.

Further, the video playing detection method further includes that: a second chart is obtained according to the second ratio and the playing moment of the video, wherein a horizontal axis of the second chart is the playing moment of the video, and a longitudinal axis of the second chart is the second ratio; and the second chart is output.

Further, the video playing detection method further includes that: a third chart is obtained according to the third ratio and the playing moment of the video, wherein a horizontal axis of the third chart is the playing moment of the video, and a longitudinal axis of the third chart is the third ratio; and the third chart is output.

To this end, according to another aspect of the disclosure, a video playing detection apparatus is provided. The video playing detection apparatus includes: a first obtaining module, configured to obtain a playing count of a video at a detection pending moment; a second obtaining module, configured to obtain a quitting moment of the video, wherein the quitting moment is a video playing completion moment; a first judgment module, configured to judge whether the playing count of the video at the detection pending moment is zero; a second judgment module, configured to judge, if the playing count of the video at the detection pending moment is zero, whether the detection pending moment is before the quitting moment; and a first detection module, configured to determine, if the detection pending moment is before the quitting moment, that video playing is not completed at the detection pending moment.

Further, the video playing detection apparatus further includes: a third judgment module, configured to judge whether a playing count of the video at a previous moment of the detection pending moment is 0; a first counting module, configured to count, if the playing count of the video at the previous moment of the detection pending moment is not 0, jumping behaviors of the video, which are video playing behaviors at the detection pending moment, traverse a plurality of playing records, and add 1 to a video jumping behavior count at the detection pending moment every time a previous moment of the detection pending moment is detected; a third obtaining module, configured to obtain a second ratio, wherein the second ratio is a ratio of the jumping behavior count to the sum of a plurality of playing records; and a second detection module, configured to detect a playing behavior of the video at the detection pending moment according to the second ratio.

Further, the video playing detection apparatus further includes: a fourth judgment module, configured to judge whether the playing count of the video at the detection pending moment is greater than 1; a second counting module, configured to count, if the playing count of the video at the detection pending moment is greater than 1, playback behaviors of the video, which are video playing behaviors at the detection pending moment, traverse a plurality of playing records, and add 1 to a video playback behavior count at the detection pending moment every time a detection pending moment is detected; a fourth obtaining module, configured to obtain a third ratio, wherein the third ratio is a ratio of the playback behavior count to the sum of a plurality of playing records; and a third detection module, configured to detect a playing behavior of the video at the detection pending moment according to the third ratio.

The disclosure provides a video playing detection method and apparatus. By means of the video playing detection method, a playing count of a video at a detection pending moment is obtained; a quitting moment of the video is obtained, wherein the quitting moment is a video playing completion moment; it is judged whether the playing count of the video at the detection pending moment is zero; if the playing count of the video at the detection pending moment is zero, it is judged whether the detection pending moment is before the quitting moment; and if the detection pending moment is before the quitting moment, it is determined that video playing is not completed at the detection pending moment. The problem in the related art where a video playing behavior cannot be accurately analyzed is solved. According to the video playing detection method, a sequence between a current moment and a video quitting moment (that is, a time sequence) is compared, and quitting and jumping behaviors of a video are introduced, and counted, thereby more accurately detecting a video playing behavior at the current moment. Meanwhile, a playback behavior is introduced into the method, and when a playing count of a video at a current moment is greater than 1, 1 is added to only a playback behavior count, thereby avoiding the situation where the playing count at the current moment is increased due to abnormal cyclic playing, and ensuring the accuracy of analysis on the quality of video contents and favor degree of a user for video contents at the current moment. By introducing the quitting, jumping and playback behaviors, the video playing detection method improves the degree of explanation of a video watching behavior of the user.

BRIEF DESCRIPTION OF THE DRAWINGS

The drawings, forming a part of the disclosure, are intended to provide a further understanding for the invention. The schematic embodiments and illustrations of the disclosure are intended to explain the disclosure, and do not form improper limits to the disclosure. In the drawings.

DETAILED DESCRIPTION OF THE EMBODIMENTS

It is important to note that embodiments in the disclosure and characteristics in the embodiments may be combined under the condition of no conflicts. The disclosure will be illustrated hereinbelow with reference to the drawings and in conjunction with the embodiments in detail.

In order to make those skilled in the art better understand the solutions in the disclosure, the technical solutions in the embodiments of the disclosure will be clearly and completely described hereinbelow with reference to the drawings in the embodiments of the disclosure. Obviously, the described embodiments are only a part of the embodiments of the disclosure, not all of the embodiments. On the basis of the embodiments in the disclosure, all other embodiments obtained on the premise of no creative work of those skilled in the art shall fall within the scope of protection of the disclosure.

It is important to note that the description and claims of the disclosure and terms 'first', 'second' and the like in the aforementioned drawings are used to distinguish similar objects, and do not need to describe a specific sequence or a precedence order. It should be understood that data used in such a way may be exchanged under appropriate conditions, in order that the embodiments of the disclosure described here can be implemented in a sequence other than sequences graphically shown or described here. In addition, terms 'include' and 'have' and any inflexions thereof are intended to cover non-exclusive inclusions.

Figure 1:
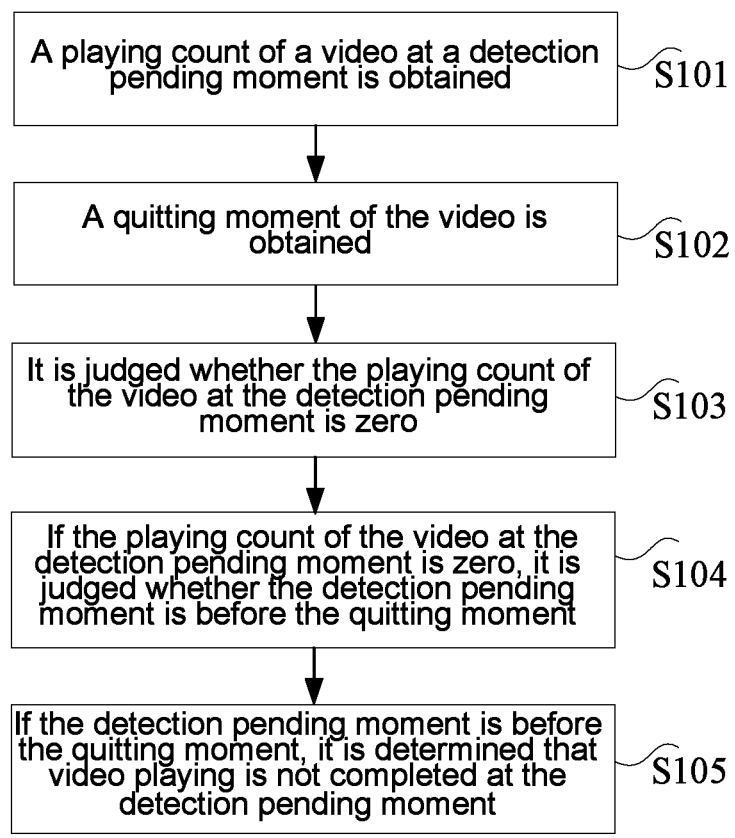
FIG. 1 is a flowchart of a video playing detection method according to a first embodiment of the disclosure.

The disclosure is intended to provide a video playing detection method and apparatus. FIG. 1 is a flowchart of a video playing detection method according to a first embodiment of the disclosure. As shown in FIG. 1, the video playing detection method includes Step S101 to Step S105.

Step S101: A playing count of a video at a detection pending moment is obtained.

When a user watches a video, relevant video watching information of the user is obtained by embedding codes into a video player where the user plays the video, wherein the video player is a software video player such as QQLive and Sohu Video, and the like. In order to research and analyze a watching behavior of the user on a video (e.g., a variety show), it is necessary to obtain a playing record of the video played by the user within a preset time (e.g., an hour or a day) from the relevant video watching information of the user. The playing record includes an identity of the user watching the video, information of the video, a playing count of the video at each moment, and the like. The obtained playing record of the video may be returned to a server by directly embedding the code into the video player, or the playing record within the preset time may be directly read from a database storing the playing record of the video.

Preferably, the step that a playing count of a video at a detection pending moment is obtained in the video playing detection method in the embodiment includes that: a video playing record stored in a preset database is searched, wherein a playing record within a preset time is stored in the preset database, and the playing record includes a video playing count at each moment; a detection pending moment is determined; and a playing count corresponding to the detection pending moment is searched in the playing record, wherein the detection pending moment is any moment of the video. According to the video playing detection method in the embodiment, each moment of the video is detected, and the quality of video contents of the video at each moment and the favor degree of the user for the video contents of the video at each moment are statistically analyzed from a detected video playing behavior of the video at each moment. Compared with the mode of obtaining the playing record of the video by embedding the codes into the video player, this embodiment where the playing record of the video is obtained from the preset database reduces the consumption of system performance, and may increase the system operation speed. There is one or more video playing records, within a preset time, filtered from the preset database, it is necessary to sort the playing records when the playing records of the video are statistically analyzed, a sorting mode may be ascending or descending according to identities of users watching the video, and the sorted playing records are stored in a playing record data table or a database for storing the sorted playing records.

Step S102: A quitting moment of the video is obtained.

The quitting moment is a video playing completion moment. Each playing record in the playing record data table or the database for storing the sorted playing records has a quitting moment. The step that the quitting moment of the video in the playing record is obtained includes that: the video playing record stored in the preset database within the preset time is traversed, and it is judged whether the playing count of the video at each moment is 0; a first moment is obtained, wherein the first moment is a moment where a playing count is 0; it is judged whether a moment where a playing count is not 0 exists after the first moment; if the moment where the playing count is not 0 does not exist after the first moment, the first moment is the quitting moment; and if the moment where the playing count is not 0 exists after the first moment, the first moment is not the quitting moment. Obtaining the quitting moment of the video in the playing record according to the video playing detection method in this embodiment is intended to be distinguished from a video playing behavior at the detection pending moment. When the playing count of the video at the detection pending moment is 0, the video playing behavior at the detection pending moment may be judged by judging a position relationship (i.e., a time sequence relationship) between the detection pending moment and the quitting moment. When the detection pending moment is before the quitting moment, video playing is not completed at the detection pending moment. By obtaining the quitting moment, the problem in the related art where it cannot be judged whether video playing is completed when a playing count at a detection pending moment is 0 may be solved, thereby achieving the effect of accurately analyzing a video playing behavior.

Step S103: It is judged whether the playing count of the video at the detection pending moment is zero.

The video playing behavior may be determined by judging the playing count at the detection pending moment. When it is determined that the playing count at the detection pending moment is not 0, video playing is not completed at the detection pending moment. When it is determined that the playing count at the detection pending moment is 0, the video playing behavior at the detection pending moment cannot be determined. When the playing count at the detection pending moment is 0, the video may be in a state of playing completion or may be in a state of playing non-completion. That is, the user skips over video contents at the detection pending moment. Therefore, in order to determine the video playing behavior when the playing count at the detection pending moment is 0, the video playing detection method in this embodiment needs to further judge a position relationship (i.e., a time sequence relationship) between the detection pending moment and the quitting moment. It is important to note that the quitting moment of the video in the playing record may be obtained by means of the following steps: determining a moment corresponding to the last non-zero playing count of the video in each video playing record from the preset database respectively; and taking a next moment of the moment corresponding to the last non-zero playing count of the video as the quitting moment of the video.

Step S104: If the playing count of the video at the detection pending moment is zero, it is judged whether the detection pending moment is before the quitting moment.

In order to accurately analyze the video playing behavior and determine the video playing behavior when the playing count at the detection pending moment is zero, after determining that the playing count at the detection pending moment is zero, the video playing detection method in this embodiment judges whether the detection pending moment is before the quitting moment. On a time axis of video playing, the quitting moment may be any moment on the time axis of video playing. When the detection pending moment is before the quitting moment, the playing count at the detection pending moment is zero, which proves that video playing at the detection pending moment is not completed but the user skips over the video contents at the detection pending moment. When the detection pending moment is after the quitting moment, since video playing has been completed at the quitting moment, it may be determined that video playing is completed at the detection pending moment. After judging whether the detection pending moment is 0, the video playing detection method in this embodiment continuously judges a position relationship (i.e., a time sequence relationship) between the detection pending moment and the quitting moment, and overcomes the technical prejudice that the zero playing count represents video playing completion.

Step S105: If the detection pending moment is before the quitting moment, it is determined that video playing is not completed at the detection pending moment.

When there is more than one video playing record stored in the preset database within the preset time, the step that the quitting moment of the video is obtained includes that the quitting moment of each playing record is obtained and the quitting moment of the video in each playing record is recorded. The positions of the quitting moments in all playing records on the time axis of video playing are different. When it is determined that the detection pending moment is after the quitting moment, video playing has been completed at the detection pending moment. When it is determined that the detection pending moment is before the quitting moment, video playing is not completed at the detection pending moment. Wherein, if the playing count at the detection pending moment is 0, the user skips over the video contents at the detection pending moment. If the playing count at the detection pending moment is not 0, the user watches the video contents at the detection pending moment. By introducing the quitting moment of the video, the video playing detection method in this embodiment can accurately analyze the video playing behavior of the user when the playing count at the detection pending moment is 0.

The video playing detection method in this embodiment includes that: a playing count of a video at a detection pending moment is obtained; a quitting moment of the video is obtained; it is judged whether the playing count of the video at the detection pending moment is zero; if the playing count of the video at the detection pending moment is zero, it is judged whether the detection pending moment is before the quitting moment; and if the detection pending moment is before the quitting moment, it is determined that video playing is not completed at the detection pending moment. By obtaining the quitting moment of the video and judging a time sequence between the detection pending moment and the quitting moment when the playing count is 0, the video playing detection method in this embodiment solves the problem in the related art where a video playing behavior cannot be accurately analyzed, and overcomes the technical prejudice in the traditional art where video playing is completed when the playing count is 0.

Figure 2:
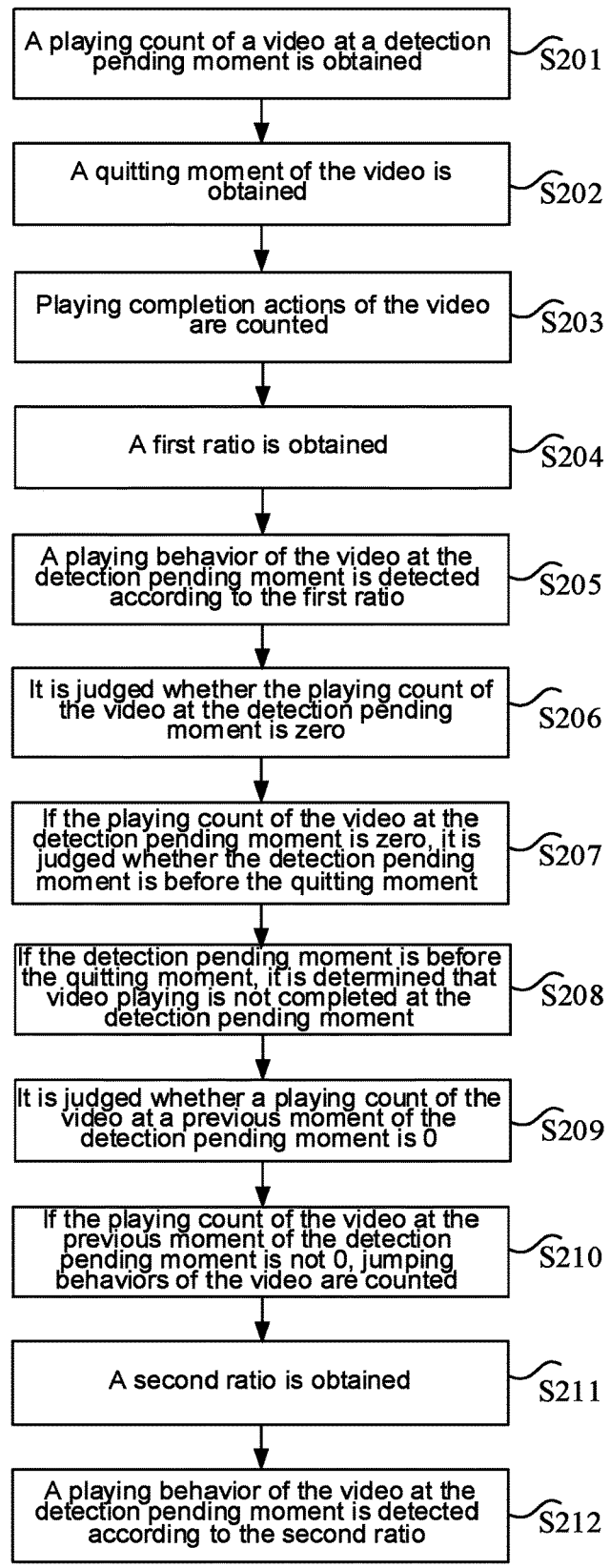
FIG. 2 is a flowchart of a video playing detection method according to a second embodiment of the disclosure.

FIG. 2 is a flowchart of a video playing detection method according to a second embodiment of the disclosure. FIG. 2 may serve as a preferred implementation mode of the embodiment shown in FIG. 1. As shown in FIG. 2, the video playing detection method includes Step S201 to Step S212.

Step S201 and Step S202 are the same as Step S101 and Step S102, which will not be elaborated herein.

Step S203: Playing completion behaviors of the video are counted, wherein the playing completion behaviors are video playing behaviors at the quitting moment, a plurality of playing records is traversed to detect the quitting moment, and every time a quitting moment is detected, 1 is added to a video playing completion behavior count at the quitting moment.

The playing completion behaviors are video playing behaviors at the quitting moment. That is, video playing is completed at the quitting moment. A plurality of playing records corresponding to a plurality of users within a preset time is stored in the preset database. Each playing record is stored at a quitting moment of a video, and a plurality of quitting moments in the plurality of playing records may be positioned at the same moment on the time axis of video playing, or may be distributed at a plurality of different moments on the time axis of video playing. According to the video playing detection method in this embodiment, statistics on the playing completion behavior of each moment on the time axis of video playing refers to: detecting the quitting moment by traversing a plurality of playing records, and every time a quitting moment is detected, adding 1 to a video playing completion behavior count at the quitting moment. By counting the playing completion behaviors, the video playing behavior is analyzed into data, and the video playing behavior at the detection pending moment is visually displayed in a data or chart form. For example, a playing completion behavior count N is statistically obtained at the first moment of the video, and it may be analyzed that N users complete watching the video at the first moment, thus causing that the quality of video contents at the first moment is lower or the video contents at the first moment cannot arouse the interest of watching of the user. Wherein, the first moment is any moment of video playing, N being less than the total number of a plurality of playing records corresponding to a plurality of users stored in the preset database within a preset time.

Step S204: A first ratio is obtained, wherein the first ratio is a ratio of a playing completion behavior count to the sum of a plurality of playing records.

After the playing completion behaviors of the video are completely counted, a ratio of a playing completion behavior count to the sum of a plurality of playing records, namely a first ratio, is obtained. The sum of the plurality of playing records in this embodiment is an effective playing count of the video at this moment. The video playing detection method in this embodiment obtains an absolute value of a playing completion behavior, namely a first ratio, to serve as an important index for measuring the video playing behavior, which can more objectively reflect the quality information of the video at each moment. As the video playing time flies within a preset time, the users who watch this video complete watching this video in sequence, so an absolute value (e.g., a playing completion behavior count, etc.) for measuring the video playing behavior is continuously reduced. Therefore, consistency of information contained in front and back measurement indexes of the video cannot be ensured by taking the absolute value as an index for measuring the video playing behavior.

Step S205: A playing behavior of the video at the detection pending moment is detected according to the first ratio.

The first ratio is a ratio of the playing completion behavior count to the sum of a plurality of playing records. After the first ratio is obtained, a first chart is obtained according to the first ratio and the playing moment of the video, wherein a horizontal axis of the first chart is the playing moment of the video, and a longitudinal axis of the first chart is the first ratio. The first ratio is displayed and output in a form of the first chart. By checking the first chart, the magnitude of the playing completion behavior count of the video at each moment is statistically analyzed, and the quality of video contents of the video at each moment and the favor degree of the user for the video contents of the video at each moment may be obtained. The video playing detection method in this embodiment makes statistics on the playing completion behaviors, displays absolute values of the playing completion behaviors in a form of a chart, more visually reflects the video playing behavior of the video at each moment, and thus contributes to quick determination of the quality of video contents and the favor degree at each moment.

Step S206 to Step S208 are the same as Step S103 to Step S105, which will not be elaborated herein.

Step S209: It is judged whether a playing count of the video at a previous moment of the detection pending moment is 0.

When the playing count at the detection pending moment is 0 and the detection pending moment is before the quitting moment, it may be determined that video playing is not completed at the detection pending moment. However, when video playing is not completed at the detection pending moment, it is only shown that the video is not played at the detection pending moment, and it cannot be accurately analyzed that a user behavior of not playing the video happens at the detection pending moment. In order to further analyze the video playing behavior at the detection pending moment, the video playing detection method in this embodiment needs to judge whether the playing count of the video at the previous moment of the detection pending moment is 0.

Step S210: If the playing count of the video at the previous moment of the detection pending moment is not 0, jumping behaviors of the video are counted, wherein the jumping behaviors are video playing behaviors at the detection pending moment, a plurality of playing records is traversed, and every time a previous moment of the detection pending moment is detected, 1 is added to a video jumping behavior count at the detection pending moment.

When the playing count of the video at the previous moment of the detection pending moment is 0, it may be determined that the user behavior of not playing the video does not happen at the detection pending moment. At this time, the video playing behavior at the detection pending moment is in a jumping state. Jumping states at the detection pending moment are counted, a plurality of playing records is traversed, and every time the detection pending moment is detected, that is, when the playing count at the detection pending moment is 0 and the playing count at the previous moment of the detection pending moment is 0, 1 is added to a jumping state count of the video at the detection pending moment. The video playing detection method in this embodiment also obtains a ratio of the jumping state count to the number of the plurality of playing records, takes the ratio as a longitudinal axis and the playing moment of the video as a horizontal axis, draws a chart, and visually displays the jumping states of the video at each moment, thus contributing to visual and quick analysis of the quality of the video at each moment. When the playing count of the video at the previous moment of the detection pending moment is not 0, it may be determined that the user behavior of not playing the video happens at the detection pending moment. The jumping behaviors of the video are counted, wherein the jumping behaviors are video playing behaviors at the detection pending moment. A plurality of playing records is traversed, and every time a previous moment of the detection pending moment is detected, 1 is added to a video jumping behavior count at the detection pending moment. The jumping behaviors of the video at each moment are counted, and by comparing the jumping behavior counts of the video at various moments, it may be obtained by analysis that the quality of video contents at a moment where the jumping behavior count is high on the time axis of video playing is lower than a moment where the jumping behavior count is low, or the video contents at the moment where the jumping behavior count is low are more favorite to the user. The video playing detection method in this embodiment introduces two measurement indexes namely a jumping state count and a jumping behavior count. Compared with a single measurement index adopting a video playing count, the video playing detection method in this embodiment enhances the degree of explanation for analysis of a video playing behavior, and more specifically and visually detects the video playing behavior at the detection pending moment.

Step S211: A second ratio is obtained, wherein the second ratio is a ratio of a jumping behavior count to the sum of a plurality of playing records.

After the jumping behaviors of the video at each moment are completely counted, a ratio of a jumping behavior count to the sum of a plurality of playing records, namely a second ratio, is obtained. The jumping behaviors happen before the quitting moment, so an effective playing count at the detection pending moment is number of a plurality of playing records corresponding to a plurality of users stored in the preset database within a preset time. Reasons for obtaining the second ratio according to the video playing detection method in this embodiment are the same as reasons for analyzing and obtaining an absolute value of the playing completion behavior in Step S204, which will not be elaborated herein.

Step S212: A playing behavior of the video at the detection pending moment is detected according to the second ratio.

The second ratio is a ratio of a jumping behavior count to the sum of a plurality of playing records. After the second ratio is obtained, a second chart is drawn by taking the second ratio as a longitudinal axis and the playing moment of the video as a horizontal axis, the second chart being used for making statistics on the probability of jumping behaviors happening at each video playing moment. A jumping behavior count corresponding to a moment where the second ratio is high is higher than that corresponding to a moment where the second ratio is low. That is, the satisfbehavior of the users for the video contents at the moment where the second ratio is high is low. The video playing detection method in this embodiment counts the jumping behaviors, displays absolute values of the jumping behaviors in a form of a chart, more visually reflects the video playing behavior of the video at each moment, and thus contributes to quick determination of the quality of video contents at each moment and the favor degree.

The video playing detection method in this embodiment includes: obtaining the playing count of the video at the detection pending moment; obtaining the quitting moment of the video; counting the playing completion behaviors of the video, traversing a plurality of playing records to detect the quitting moment, and every time a quitting moment is detected, adding 1 to a video playing completion behavior count at the quitting moment; obtaining a first ratio; detecting a playing behavior of the video at the detection pending moment according to the first ratio; judging whether a playing count of the video at the detection pending moment is zero; if the playing count of the video at the detection pending moment is zero, judging whether the detection pending moment is before the quitting moment, and if the detection pending moment is before the quitting moment, determining that video playing is not completed at the detection pending moment; judging whether a playing count of the video at a previous moment of the detection pending moment is 0; if the playing count of the video at the previous moment of the detection pending moment is not 0, counting jumping behaviors of the video, traversing a plurality of playing records, and every time a previous moment of the detection pending moment is detected, adding 1 to a video jumping behavior count at the detection pending moment; obtaining a second ratio; and detecting a playing behavior of the video at the detection pending moment according to the second ratio. The video playing detection method in this embodiment counts the playing completion behaviors, the jumping states and the jumping behaviors at the detection pending moment, obtains absolute values of the playing completion behaviors, the jumping states and the jumping behaviors as indexes for measuring the quality of the video and the favor degree of the user, displays these indexes in a form of a chart, solves the problem in the related art where a video playing behavior cannot be accurately analyzed, and thus achieves the effects of visually analyzing the quality of video contents and the favor degree at each moment.

Figure 3:
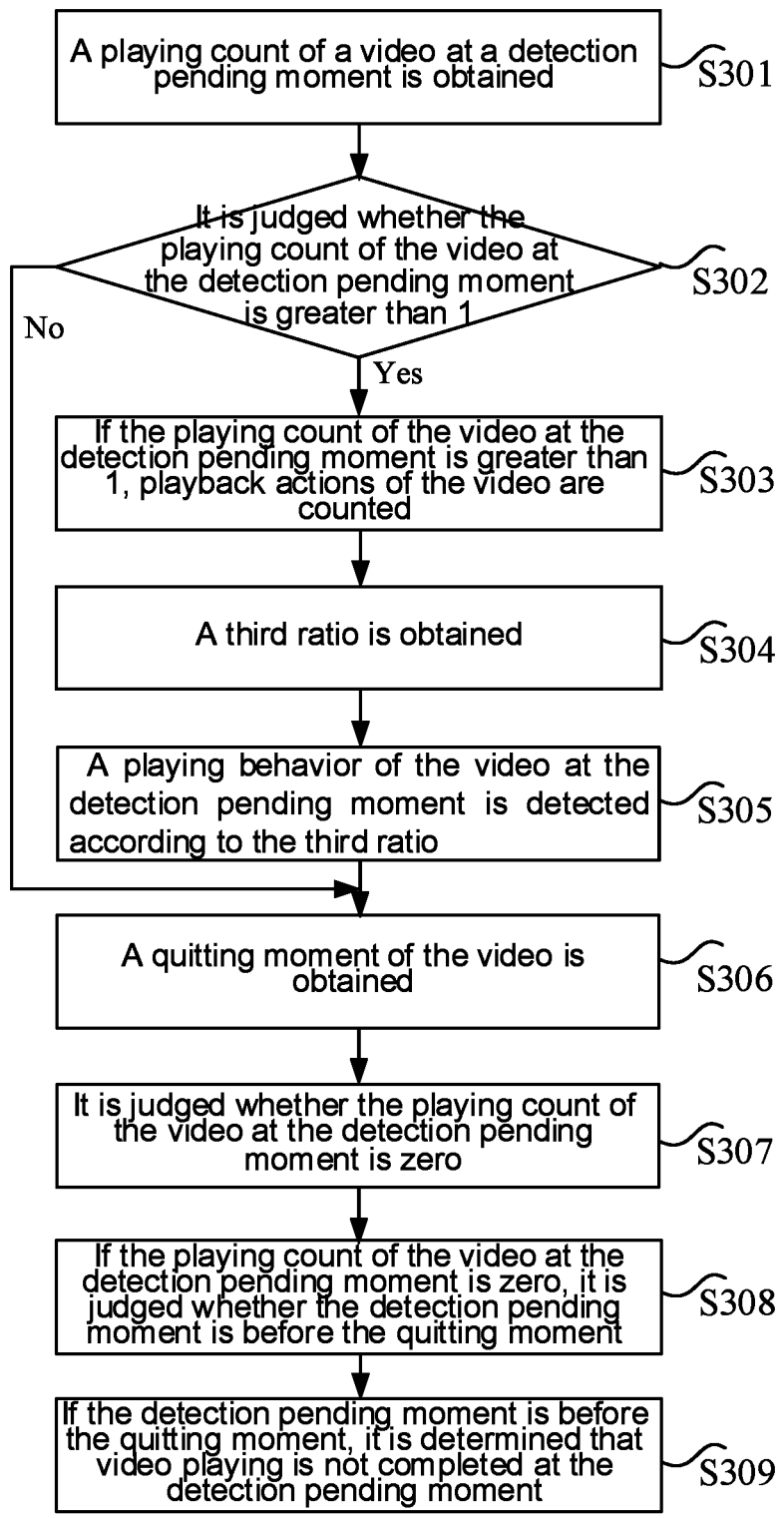
FIG. 3 is a flowchart of a video playing detection method according to a third embodiment of the disclosure.

FIG. 3 is a flowchart of a video playing detection method according to a third embodiment of the disclosure. FIG. 3 may serve as a preferred implementation mode of the embodiment shown in FIG. 1. As shown in FIG. 3, the video playing detection method includes Step S301 to Step S309.

Step S301 is the same as Step S101, which will not be elaborated herein.

Step S302: It is judged whether the playing count of the video at the detection pending moment is greater than 1.

The detection pending moment is any moment in a video playing process. The playing count at the detection pending moment may be 0, may be 1 or may be greater than 1. When the playing count at the detection pending moment is 1, the video playing behavior at the detection pending moment is an actual playing behavior. When the playing count at the detection pending moment is greater than 1, the video playing behavior at the detection pending moment is a playback behavior, wherein the playback behavior is a video playing behavior at a moment where the playing count is greater than 1, and the playback behavior is used for repeatedly playing the video contents at a moment where the playback behavior happens for more than one time. In order to accurately detect the video playing behavior at the detection pending moment, after the playing count at the detection pending moment is obtained, it is first judged whether the playing count of the video at the detection pending moment is greater than 1, and it is judged whether the video playing behavior at the detection pending moment is the playback behavior. The video playing detection method in this embodiment additionally judges whether the playing count at the detection pending moment is greater than 1, thereby ensuring the completeness and accuracy of judgment and analysis on the video playing behavior at the detection pending moment.

Step S303: If the playing count of the video at the detection pending moment is greater than 1, playback behaviors of the video are counted, wherein the playback behaviors are video playing behaviors at the detection pending moment, a plurality of playing records is traversed, and every time a detection pending moment is detected, 1 is added to a video playback behavior count at the detection pending moment.

When it is determined that the playing count at the detection pending moment is less than or equal to 1, two situations are included. The first situation is that when the playing count at the detection pending moment is 1, the video playing behavior at the detection pending moment is an actual playing behavior, and the video is normally played at the detection pending moment. The second situation is that when the playing count at the detection pending moment is 0, a method for detecting the video playing behavior at the detection pending moment has been analyzed in the first embodiment for the video playing detection method according to the disclosure, which will not be elaborated herein. When the playing count at the detection pending moment is greater than 1, the video playing behavior at the detection pending moment is a playback behavior, and at this time, playback behaviors of the video are counted. A plurality of playing records is traversed, and every time a detection pending moment is detected, 1 is added to a video playback behavior count at the detection pending moment. The video playing detection method in this embodiment counts the playback behaviors of the video at each moment in order to analyze the favor degree for video contents of the video at each moment.

Step S304: A third ratio is obtained, wherein the third ratio is a ratio of the playback behavior count to the sum of a plurality of playing records.

After the playback behaviors of the video at each moment are completely counted, a ratio of the playback behavior count to the sum of a plurality of playing records, namely a third ratio, is obtained. Since the playback behaviors happen before the quitting moment, an effective playing count at the detection pending moment is number of a plurality of playing records corresponding to a plurality of users stored in the preset database within a preset time. Reasons for obtaining the third ratio according to the video playing detection method in this embodiment are the same as reasons for analyzing and obtaining an absolute value of the playing completion behavior in Step S204, which will not be elaborated herein.

Step S305: A playing behavior of the video at the detection pending moment is detected according to the third ratio.

The third ratio is a ratio of a playback behavior count to the sum of a plurality of playing records. After the third ratio is obtained, a third chart is obtained according to the third ratio and the playing moment of the video, wherein a horizontal axis of the third chart is the playing moment of the video, and a longitudinal axis of the third chart is the third ratio; and the third chart is output. The third chart is used for making statistics on the probability of playback behaviors happening at each video playing moment. A playback behavior count corresponding to a moment where the third ratio is high is higher than that corresponding to a moment where the third ratio is low. That is, the video contents at the moment where the third ratio is high are deeply loved by the user. The video playing detection method in this embodiment introduces the playback behaviors as indexes for measuring the quality of the video contents at the detection pending moment, displays absolute values of the playback behaviors in a form of a chart, and visually reflects the quality of the video contents of the video and the favor degree at each moment. The video playing detection method in this embodiment adds 1 to the playback behavior count immediately when the playing count at the detection pending moment is greater than 1, thereby avoiding the situation of inaccurate analysis on a video playing behavior caused by abnormal cyclic playing.

Step S306 to Step S309 are the same as Step S102 to Step S105, which will not be elaborated herein.

The video playing detection method in this embodiment includes: obtaining the playing count of the video at the detection pending moment; judging whether the playing count of the video at the detection pending moment is greater than 1; if the playing count of the video at the detection pending moment is greater than 1, counting the playback behaviors of the video, traversing a plurality of playing records, and every time a detection pending moment is detected, adding 1 to a video playback behavior count at the detection pending moment; obtaining a third ratio; detecting a playing behavior of the video at the detection pending moment according to the third ratio; obtaining the quitting moment of the video; judging whether a playing count of the video at the detection pending moment is zero; if the playing count of the video at the detection pending moment is zero, judging whether the detection pending moment is before the quitting moment; and if the detection pending moment is before the quitting moment, determining that video playing is not completed at the detection pending moment. By means of the video playing detection method in this embodiment, the problem in the related art where a video playing behavior cannot be accurately analyzed is solved. Meanwhile, the video playing detection method in this embodiment introduces the playback behaviors. When the playing count of the video at a current moment is greater than 1, 1 is added only to the playback behavior count, thereby avoiding the situation where a playing count is increased due to abnormal cyclic playing, and ensuring the accuracy of analysis on the quality of video contents and the favor degree of the user at the current moment.

Alternatively, a plurality of playing records corresponding to a plurality of users within a preset time is stored in the preset database, and after the playing count of the video at the detection pending moment is obtained, the method further includes that: it is judged whether the playing count of the video at the detection pending moment is greater than 1; if the playing count of the video at the detection pending moment is greater than 1, playback behaviors of the video are counted, wherein the playback behaviors are video playing behaviors at the detection pending moment, a plurality of playing records is traversed, and if it is detected that a count at the detection pending moment is greater than 1 in a certain playing record, 1 is added to a video playback behavior count at the detection pending moment corresponding to the playing record; a fourth ratio is obtained, wherein the fourth ratio is a ratio of the playback behavior count to the sum of a plurality of playing records; and a playing behavior of the video at the detection pending moment is detected according to the fourth ratio.

By means of the above technical solutions, more than one playback in the same playing record is counted for only one time, thereby solving the problem in the related art where a video playing behavior cannot be accurately analyzed. Meanwhile, the video playing detection method in this embodiment introduces the playback behaviors. When the playing count of the video at a current moment is greater than 1, 1 is added to the playback behavior count, thereby avoiding the situation where a playing count is increased due to abnormal cyclic playing, and ensuring the accuracy of analysis on the quality of video contents and the favor degree of the user at the current moment.

From the above description, it may be seen that the video playing detection method provided in the embodiments of the disclosure detects a video playing behavior by judging the playing count at the detection pending moment, introduces and counts playing behavior, jumping behavior and playback behavior measurement indexes, and analyzes absolute values of these indexes to obtain the quality of video contents and the favor degree at each moment. The video playing detection method provided in the embodiments of the disclosure solves the problem in the related art where a video playing behavior cannot be accurately analyzed, thereby achieving the effect of quickly and accurately detecting a video playing behavior.

It is important to note that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The embodiments of the disclosure also provide a video playing detection apparatus. It is important to note that the video playing detection apparatus may be configured to execute the video playing detection method in the embodiments of the disclosure. The video playing detection apparatus provided in the embodiments of the disclosure will be introduced hereinbelow.

Figure 4:
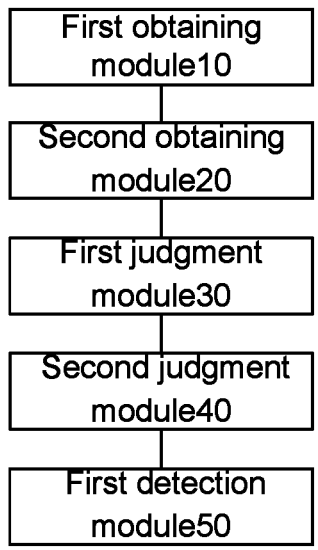
FIG. 4 is a schematic diagram of a video playing detection apparatus according to a first embodiment of the disclosure.

FIG. 4 is a schematic diagram of a video playing detection apparatus according to a first embodiment of the disclosure. As shown in FIG. 4, the video playing detection apparatus includes: a first obtaining module 10, a second obtaining module 20, a first judgment module 30, a second judgment module 40 and a first detection module 50.

The first obtaining module 10 is configured to obtain a playing count of a video at a detection pending moment.

Specifically, the first obtaining module 10 includes: a first searching module, configured to search a video playing record stored in a preset database, wherein a playing record within a preset time is stored in the preset database, and the playing record includes a video playing count at each moment; a determination module, configured to determine a detection pending moment; and a second searching module, configured to search a playing count corresponding to the detection pending moment in the playing record.

The second obtaining module 20 is configured to obtain a quitting moment of the video, wherein the quitting moment is a video playing completion moment.

Specifically, the second obtaining module 20 includes: a traversal module, configured to traverse the video playing record stored in the preset database within the preset time, and judge whether the video playing count at each moment is 0; a first obtaining sub-module, configured to obtain a first moment, wherein the first moment is a moment where a playing count is 0; and a first judgment sub-module, configured to judge whether a moment where a playing count is not 0 exists after the first moment, wherein if the moment where the playing count is not 0 does not exist after the first moment, the first moment is the quitting moment, and if the moment where the playing count is not 0 exists after the first moment, the first moment is not the quitting moment.

The first judgment module 30 is configured to judge whether the playing count of the video at the detection pending moment is zero.

The second judgment module 40 is configured to judge, if the playing count of the video at the detection pending moment is zero, whether the detection pending moment is before the quitting moment.

The first detection module 50 is configured to determine, if the detection pending moment is before the quitting moment, that video playing is not completed at the detection pending moment.

The video playing detection apparatus includes: the first obtaining module 10, the second obtaining module 20, the first judgment module 30, the second judgment module 40 and the first detection module 50. The video playing detection apparatus solves the problem in the related art where a video playing behavior cannot be accurately analyzed.

Figure 5:
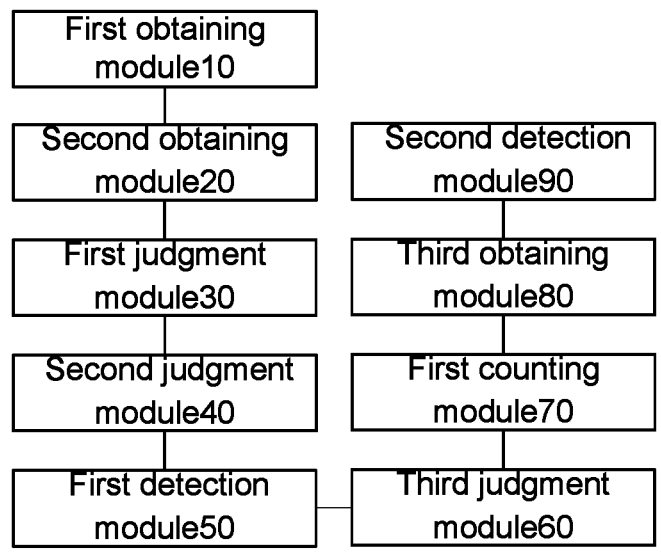
FIG. 5 is a schematic diagram of a video playing detection apparatus according to a second embodiment of the disclosure.

FIG. 5 is a schematic diagram of a video playing detection apparatus according to a second embodiment of the disclosure. FIG. 5 may serve as a preferred implementation mode of the embodiment shown in FIG. 4. As shown in FIG. 5, the video playing detection apparatus includes: a first obtaining module 10, a second obtaining module 20, a first judgment module 30, a second judgment module 40, a first detection module 50, a third judgment module 60, a first counting module 70, a third obtaining module 80 and a second detection module 90.

The functions of the first obtaining module 10, the second obtaining module 20, the first judgment module 30, the second judgment module 40 and the first detection module 50 are the same as those in the aforementioned embodiment, which will not be elaborated herein.

The third judgment module 60 is configured to judge whether a playing count of the video at a previous moment of the detection pending moment is 0.

The first counting module 70 is configured to count, if the playing count of the video at the previous moment of the detection pending moment is not 0, jumping behaviors of the video, wherein the jumping behaviors are video playing behaviors at the detection pending moment, a plurality of playing records is traversed, and every time a previous moment of the detection pending moment is detected, 1 is added to a video jumping behavior count at the detection pending moment.

The third obtaining module 80 is configured to obtain a second ratio, wherein the second ratio is a ratio of the jumping behavior count to the sum of a plurality of playing records.

The second detection module 90 is configured to detect a playing behavior of the video at the detection pending moment according to the second ratio.

The video playing detection apparatus includes: the first obtaining module 10, the second obtaining module 20, the first judgment module 30, the second judgment module 40, the first detection module 50, the third judgment module 60, the first counting module 70, the third obtaining module 80 and the second detection module 90. The video playing detection apparatus solves the problem in the related art where a video playing behavior cannot be accurately analyzed. Meanwhile, the video playing detection apparatus introduces jumping behaviors, counts the jumping behaviors, displays absolute values of the jumping behaviors in a form of a chart, and thus is capable of quickly and accurately analyzing the quality of video contents and the favor degree at a detection pending moment.

Figure 6:
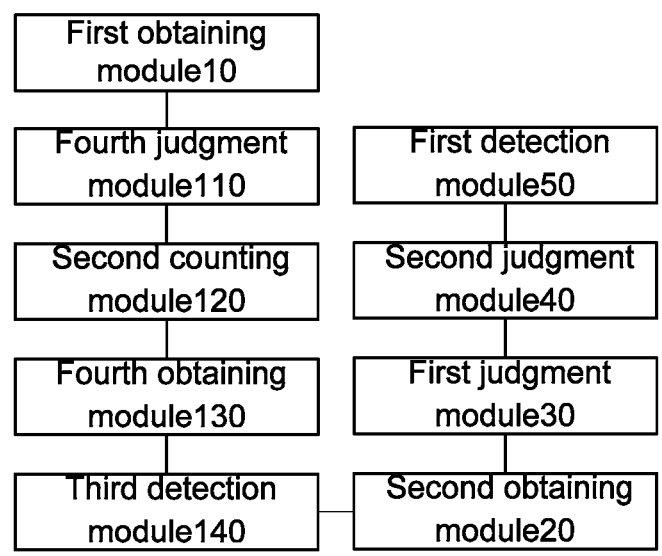
FIG. 6 is a schematic diagram of a video playing detection apparatus according to a third embodiment of the disclosure.

FIG. 6 is a schematic diagram of a video playing detection apparatus according to a third embodiment of the disclosure. FIG. 6 may serve as a preferred implementation mode of the embodiment shown in FIG. 4. As shown in FIG. 6, the video playing detection apparatus includes: a first obtaining module 10, a second obtaining module 20, a first judgment module 30, a second judgment module 40, a first detection module 50, a fourth judgment module 110, a second counting module 120, a fourth obtaining module 130 and a third detection module 140.

The functions of the first obtaining module 10, the second obtaining module 20, the first judgment module 30, the second judgment module 40 and the first detection module 50 are the same as those in the aforementioned embodiment, which will not be elaborated herein.

The fourth judgment module 110 is configured to judge whether the playing count of the video at the detection pending moment is greater than 1.

The second counting module 120 is configured to count, if the playing count of the video at the detection pending moment is greater than 1, playback behaviors of the video, which are video playing behaviors at the detection pending moment, traverse a plurality of playing records, and add 1 to a video playback behavior count at the detection pending moment every time a detection pending moment is detected.

The fourth obtaining module 130 is configured to obtain a third ratio, wherein the third ratio is a ratio of the playback behavior count to the sum of a plurality of playing records.

The third detection module 140 is configured to detect a playing behavior of the video at the detection pending moment according to the third ratio.

The video playing detection apparatus includes: the first obtaining module 10, the second obtaining module 20, the first judgment module 30, the second judgment module 40, the first detection module 50, the fourth judgment module 110, the second counting module 120, the fourth obtaining module 130 and the third detection module 140. The video playing detection apparatus solves the problem in the related art where a video playing behavior cannot be accurately analyzed. Meanwhile, the video playing detection apparatus introduces playback behaviors, counts the playback behaviors, displays absolute values of the playback behaviors in a form of a chart, and thus is capable of avoiding the situation where a playing count is increased due to abnormal cyclic playing, and improving the accuracy of analysis on the quality of video contents and the favor degree at a detection pending moment.

The video playing detection apparatus includes a processor and a memory. The first obtaining module, the second obtaining module, the first judgment module, the second judgment module, the first detection module, the fourth judgment module, the second counting module, the fourth obtaining module and the third detection module are stored in the memory as program units, and the processor executes the program units stored in the memory to achieve corresponding functions.

The processor includes a kernel, and the kernel calls corresponding program units from the memory. There may be one or more kernels, and a video playing behavior is detected by adjusting kernel parameters.

The memory may include a volatile memory, a Random Access Memory (RAM), a non-volatile memory and/or other forms in a computer-readable medium such as a Read Only Memory (ROM) or a flash RAM. The memory includes at least one storage chip.

The disclosure also provides an embodiment for a computer program product. When being executed on a data processing device, the computer program product is suitable for executing program codes for initializing the following method steps: obtaining a playing count of a video at a detection pending moment; obtaining a quitting moment of the video, wherein the quitting moment is a video playing completion moment; judging whether the playing count of the video at the detection pending moment is zero; if the playing count of the video at the detection pending moment is zero, judging whether the detection pending moment is before the quitting moment; and if the detection pending moment is before the quitting moment, determining that video playing is not completed at the detection pending moment.

Obviously, those skilled in the art shall understand that all of the aforementioned modules or steps in the disclosure may be implemented by using a general calculation apparatus, may be centralized on a single calculation apparatus or may be distributed on a network composed of a plurality of calculation apparatuses. Alternatively, they may be implemented by using executable program codes of the calculation apparatuses. Thus, they may be stored in a storage apparatus and executed by the calculation apparatuses, or they are manufactured into each integrated circuit module respectively, or multiple modules or steps therein are manufactured into a single integrated circuit module. Thus, the disclosure is not limited to a combination of any specific hardware and software.

The above is only the preferred embodiments of the disclosure, and not intended to limit the disclosure. There may be various modifications and variations in the disclosure for those skilled in the art. Any modifications, equivalent replacements, improvements and the like made within the spirit and principle of the disclosure shall fall within the scope of protection of the disclosure.

What is claimed is:

1. A video playing detection method, comprising:
    obtaining, by a server, a playing count of a video at a detection pending moment;
    obtaining, by the server, a quitting moment of the video, wherein the quitting moment is a video playing completion moment;
    judging, by the server, whether the playing count of the video at the detection pending moment is zero;
    if the playing count of the video at the detection pending moment is zero, judging, by the server, whether the detection pending moment is before the quitting moment; and
    if the detection pending moment is before the quitting moment, determining, by the server, that video playing is not completed at the detection pending moment,
    wherein obtaining, by the server, the quitting moment of the video comprises: traversing, by the server, the video playing record stored in a preset database within a preset time, and judging, by the server, whether the video playing count at each moment is 0; obtaining, by the server, a first moment, the first moment being a moment where a playing count is 0; judging, by the server, whether a moment where a playing count is not 0 exists after the first moment if the moment where the playing count is not 0 does not exist after the first moment, determining, by the server, that the first moment is the quitting moment and if the moment where the playing count is not 0 exists after the first moment, determining, by the server, that the first moment is not the quitting moment.

2. The video playing detection method according to claim 1, wherein obtaining, by the server, a playing count of a video at a detection pending moment comprises:
    searching, by the server, a video playing record stored in the preset database, a playing record within a preset time being stored in the preset database, and the playing record comprising the video playing count at each moment;
    determining, by the server, the detection pending moment; and
    searching, by the server, a playing count corresponding to the detection pending moment in the playing record.

3. The video playing detection method according to claim 1, wherein a plurality of playing records corresponding to a plurality of users within the preset time is stored in the preset database, and after it is determined that other moments where the playing count is not 0 do not exist after the moment where the playing count is 0, the method further comprises:
    counting, by the server, playing completion behaviors of the video, wherein the playing completion behaviors are video playing behaviors at the quitting moment, a plurality of playing records is traversed to detect the quitting moment, and every time the quitting moment is detected, 1 is added to a video playing completion behavior count at the quitting moment;
    obtaining, by the server, a first ratio, wherein the first ratio is a ratio of the playing completion behavior count to the sum of a plurality of playing records; and
    detecting, by the server, a playing behavior of the video at the detection pending moment according to the first ratio.

4. The video playing detection method according to claim 2, wherein a plurality of playing records corresponding to a plurality of users within the preset time is stored in the preset database, and after it is determined that video playing is not completed at the detection pending moment if the detection pending moment is before the quitting moment, the method further comprises:
    judging, by the server, whether a playing count of the video at a previous moment of the detection pending moment is 0;

when the playing count of the video at the previous moment of the detection pending moment is not 0, counting, by a server, jumping behaviors of the video, wherein the jumping behaviors are video playing behaviors at the detection pending moment, a plurality of playing records is traversed, and every time the previous moment of the detection pending moment is detected, 1 is added to a video jumping behavior count at the detection pending moment;

obtaining, by a server, a second ratio, wherein the second ratio is a ratio of the jumping behavior count to the sum of a plurality of playing records; and detecting, by a server, a playing behavior of the video at the detection pending moment according to the second ratio.

5. The video playing detection method according to claim 2, wherein a plurality of playing records corresponding to a plurality of users within the preset time is stored in the preset database, and after the playing count of the video at the detection pending moment is obtained, the method further comprises:

judging, by a server, whether the playing count of the video at the detection pending moment is greater than 1;

when the playing count of the video at the detection pending moment is greater than 1, counting, by the server, playback behaviors of the video, wherein the playback behaviors are video playing behaviors at the detection pending moment, a plurality of playing records is traversed, and every time the detection pending moment is detected, 1 is added to a video playback behavior count at the detection pending moment;

obtaining, by the server, a third ratio, wherein the third ratio is a ratio of the playback behavior count to the sum of a plurality of playing records; and detecting, by the server, a playing behavior of the video at the detection pending moment according to the third ratio.

6. The video playing detection method according to claim 2, wherein a plurality of playing records corresponding to a plurality of users within the preset time is stored in the preset database, and after the playing count of the video at the detection pending moment is obtained, the method further comprises:

judging, by the server, whether the playing count of the video at the detection pending moment is greater than 1;

when the playing count of the video at the detection pending moment is greater than 1, counting, by the server, playback behaviors of the video, wherein the playback behaviors are video playing behaviors at the detection pending moment, a plurality of playing records is traversed, and if it is detected that a count at the detection pending moment is greater than 1 in a certain playing record, 1 is added to a video playback behavior count at the detection pending moment corresponding to the playing record;

obtaining, by the server, a fourth ratio, wherein the fourth ratio is a ratio of the playback behavior count to the sum of a plurality of playing records; and detecting, by the server, a playing behavior of the video at the detection pending moment according to the fourth ratio.

7. The video playing detection method according to claim 3, further comprising:

obtaining, by the server, a first chart according to the first ratio and the playing moment of the video, wherein a horizontal axis of the first chart is the playing moment of the video, and a longitudinal axis of the first chart is the first ratio; and outputting, by the server, the first chart.

8. The video playing detection method according to claim 4, further comprising:

obtaining, by the server, a second chart according to the second ratio and the playing moment of the video, wherein a horizontal axis of the second chart is the playing moment of the video, and a longitudinal axis of the second chart is the second ratio; and outputting, by the server, the second chart.

9. The video playing detection method according to claim 5, further comprising:

obtaining, by the server, a third chart according to the third ratio and the playing moment of the video, wherein a horizontal axis of the third chart is the playing moment of the video, and a longitudinal axis of the third chart is the third ratio; and outputting the third chart.

10. A video playing detection apparatus, comprises a hardware processor configured to execute program modules stored on a memory, the program modules comprising:

a first obtaining module, configured to obtain a playing count of a video at a detection pending moment;

a second obtaining module, configured to obtain a quitting moment of the video, wherein the quitting moment is a video playing completion moment;

a first judgment module, configured to judge whether the playing count of the video at the detection pending moment is zero;

a second judgment module, configured to judge, if the playing count of the video at the detection pending moment is zero, whether the detection pending moment is before the quitting moment; and a first detection module, configured to determine, if the detection pending moment is before the quitting moment, that video playing is not completed at the detection pending moment;

wherein the second obtaining module is configured to traverse the video playing record stored in a preset database within a preset time, and judge whether the video playing count at each moment is 0; obtain a first moment, the first moment being a moment where a playing count is 0; judge whether a moment where a playing count is not 0 exists after the first moment if the moment where the playing count is not 0 does not exist after the first moment, determine that the first moment is the quitting moment and if the moment where the playing count is not 0 exists after the first moment, determine that the first moment is not the quitting moment.

11. The video playing detection apparatus according to claim 10, the program modules further comprising:

a third judgment module, configured to judge whether a playing count of the video at a previous moment of the detection pending moment is 0;

a first counting module, configured to count, if the playing count of the video at the previous moment of the detection pending moment is not 0, jumping behaviors of the video, which are video playing behaviors at the detection pending moment, traverse a plurality of playing records, and add 1 to a video jumping behavior count at the detection pending moment every time the previous moment of the detection pending moment is detected;

a third obtaining module, configured to obtain a second ratio, wherein the second ratio is a ratio of the jumping behavior count to the sum of a plurality of playing records; and a second detection module, configured to detect a playing behavior of the video at the detection pending moment according to the second ratio.

12. The video playing detection apparatus according to claim 10, the program modules further comprising:

a fourth judgment module, configured to judge whether the playing count of the video at the detection pending moment is greater than 1;

a second counting module, configured to count, if the playing count of the video at the detection pending moment is greater than 1, playback behaviors of the video, which are video playing behaviors at the detection pending moment, traverse a plurality of playing records, and add 1 to a video playback behavior count at the detection pending moment every time the detection pending moment is detected;

a fourth obtaining module, configured to obtain a third ratio, wherein the third ratio is a ratio of the playback behavior count to the sum of a plurality of playing records; and a third detection module, configured to detect a playing behavior of the video at the detection pending moment according to the third ratio.

* * * * *